United States Patent [19]

Mori

[11] Patent Number: 5,099,777
[45] Date of Patent: Mar. 31, 1992

[54] SEWING OPERATION PROCEDURE DISPLAY APPARATUS FOR SEWING MACHINE

[75] Inventor: Tomohiko Mori, Nagoya, Japan
[73] Assignee: Brother Kogyo Kabushiki Kaisha, Nagoya, Japan
[21] Appl. No.: 698,080
[22] Filed: May 10, 1991
[30] Foreign Application Priority Data Jul. 23, 1990 [JP] Japan ................... 2-194415

[51] Int. Cl.⁵ .......................... D05B 3/02
[52] U.S. Cl. ..................... 112/445; 112/458; 112/121.11
[58] Field of Search ........... 112/445, 453, 458, 121.11, 112/121.12, 456; 364/470

[56] References Cited

U.S. PATENT DOCUMENTS

| 4,811,673 | 3/1989 | Yoshida | 112/445 |
| 4,860,678 | 8/1989 | Skogward | 112/445 |
| 4,869,188 | 9/1989 | Hyodo | 112/445 |
| 4,901,636 | 2/1990 | Yoshida | 112/121.11 |
| 4,943,906 | 7/1990 | Tajima et al. | 112/458 X |

FOREIGN PATENT DOCUMENTS

6415090  1/1989  Japan ................... 112/458
2-31789  2/1990  Japan .

Primary Examiner—Peter Nerbun
Attorney, Agent, or Firm—Oliff & Berridge

[57] ABSTRACT

A sewing operation procedure display apparatus for a sewing machine for teaching information regarding a sewing operation includes an LCD provided on a body of the sewing machine, and a ROM in which data of a plurality of teaching picture images are stored corresponding to stitches of a "plain seaming stitch", a "button hole" and a "blind stitch" and sewing conditions for an "expansible fabric" and a "blind stitch". The sewing operation procedure display apparatus further includes an operation selection section for selecting one of the stitches and a sewing condition such as a type of a fabric, and a CPU for reading out a teaching picture image or images in accordance with the stitch and the sewing condition selected by way of the operation selection section from the ROM and causes the LCD to display the teaching picture image or images thereon.

15 Claims, 9 Drawing Sheets

1. BUTTON HOLE SEWING

1. SET BUTTON TO PRESSER FOOT
2. DROP BUTTON HOLE SEWING LEVER
3. START SEWING MACHINE TO PERFORM BUTTON HOLE SEWING CONFORMING TO BUTTON

5,099,777

SEWING OPERATION PROCEDURE DISPLAY APPARATUS FOR SEWING MACHINE

BACKGROUND OF THE INVENTION

1. Field of the Invention

This invention relates to a sewing operation procedure display apparatus provided for a sewing machine on which a plurality of kinds of stitches can be sewn, and more particularly to a sewing operation procedure display apparatus for a sewing machine wherein a teaching picture image is displayed on a display screen in accordance with a stitch and a sewing condition.

2. Description of Related Art

In recent years, in the field of sewing machines for home use, so-called computerized sewing machines have been put into practical use on which various stitches can be sewn and various patterns can be formed.

In such computerized sewing machines, various mechanisms are controlled by a microcomputer, and if an operator selectively operates various switches provided on an operating section to select a desired stitch, then a sewing operation of stitches including not only such comparatively simple stitches such as a straight stitch and a zigzag stitch but also such complicated stitches as a blind stitch, a plain seam stitch and button hole sewing can be performed in accordance with stitch data previously stored in a memory.

In a sewing machine of the above-mentioned type, when any one of various stitches is to be sewn, an operator must operate the sewing machine in accordance with the stitch to be sewn by, for example, exchanging a presser foot or operating a special change-over lever.

Due to such circumstances, if the operator is not very familiar with the particular sewing machine, then the operator must locate and read an operating manual whenever
the sewing machine is to be used, which is cumbersome.

Figure 11:
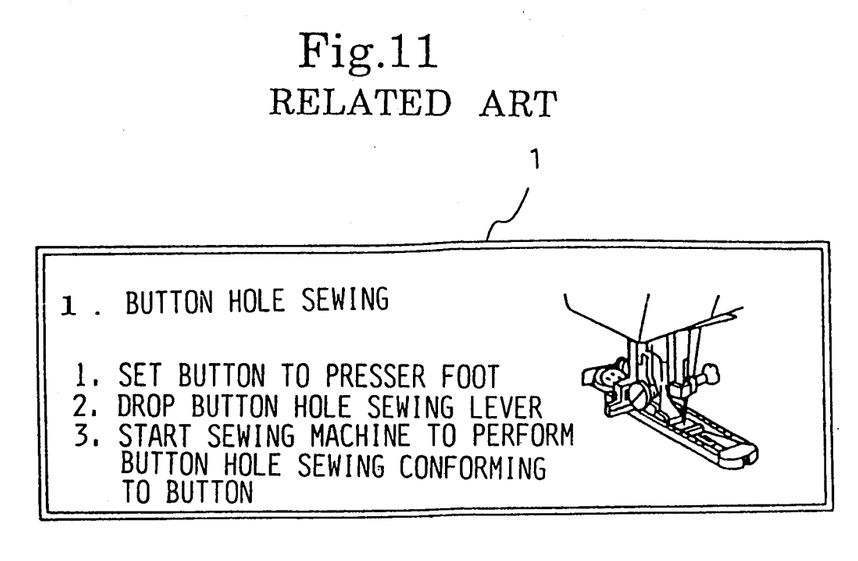
FIG. 11 is an illustration showing an example of a display image on a conventional sewing operation procedure display apparatus.

A sewing machine is disclosed in U.S. Pat. No. 4,901,656 wherein information regarding sewing is displayed on a display section provided on a front face of a body of the sewing machine. With the sewing machine, if an operator operates a switch to select a teaching mode and then selects a desired stitch (for example, button hole sewing) then an operation procedure of operation for button hole sewing is displayed on a screen of a display section I as shown in FIG. 11.

However, with such apparatus which teaches sewing information as described above, only stitch selection is available and only one teaching picture image is prepared for each of various stitches.

A single stitch of one kind is, however, sometimes sewn in accordance with different procedures depending upon sewing conditions such as whether the type of a fabric to be sewn is a ordinary one or a stretchable one. Consequently, sometimes a teaching picture image does not conform to a condition of use of the sewing machine in actual sewing operation, or a method of operation may not be sufficiently understood by an operator.

SUMMARY OF THE INVENTION

It is an object of the present invention to provide a sewing operation procedure display apparatus for a sewing machine which can teach information regarding a sewing operation in such a manner that an operator can readily understand the information.

It is a further object of the present invention to provide a sewing operation procedure display apparatus for a sewing machine wherein a teaching picture image is displayed on a display section in accordance with a stitch and a sewing condition so as to teach in detail information regarding a sewing operation.

In order to attain the objects, according to the present invention, there is provided a sewing operation procedure display apparatus for a sewing machine for teaching information regarding a sewing operation, which comprises a display section provided on a body of the sewing machine, storage means for storing picture image data related to a plurality of teaching picture images corresponding to stitches and sewing conditions, stitch selecting means for selecting a stitch, sewing condition selecting means for selecting a sewing condition such as a type of a fabric, and display controlling means responsive to operation of the stitch selecting means and the sewing condition selecting means for reading out one of the teaching picture images corresponding to a stitch and a sewing condition selected by such operation from the storage means and causing the display section to display such stitch and sewing condition thereon.

With the sewing operation procedure display 0 apparatus for a sewing machine, an operator will operate both of the stitch selecting means for selecting a stitch and the sewing condition selecting means for selecting a sewing condition.

Then, based on the picture image data corresponding to stitches and sewing conditions stored in the storage means, the display controlling means causes the display section to display a particular picture image thereon.

Accordingly, information regarding a sewing operation in which not only a stitch but also a sewing condition are taken into consideration can be easily taught to an operator and in a manner in which the operator can readily understand.

BRIEF DESCRIPTION OF THE DRAWINGS

A preferred embodiment of the present invention will be described in detail with reference to the following figures wherein.

DETAILED DESCRIPTION OF THE PREFERRED EMBODIMENTS

Figure 3:
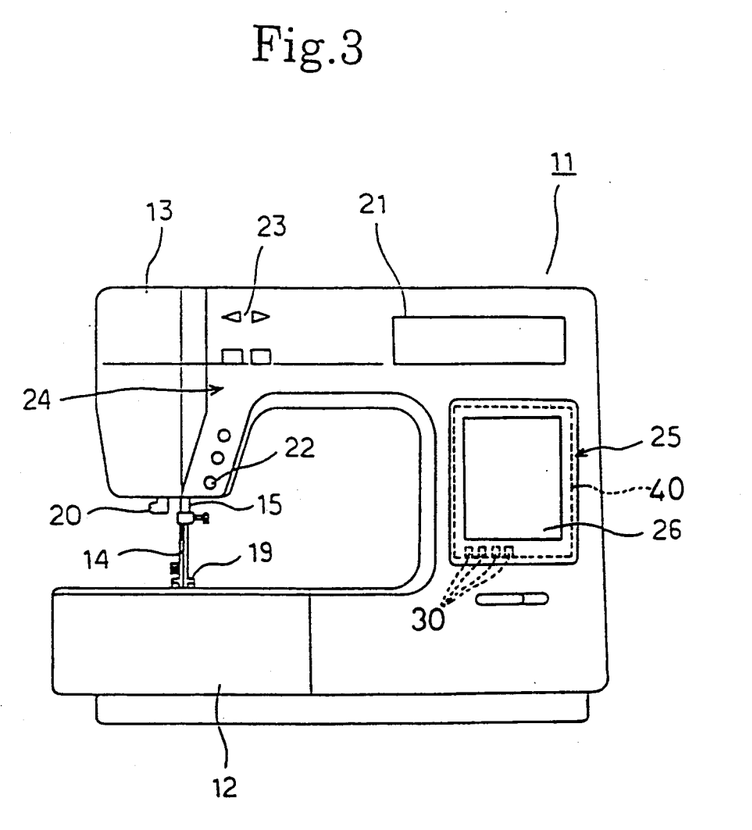
FIG. 3 is a front elevational view showing a sewing machine in which a sewing operation procedure display apparatus according to the present invention is incorporated.

Referring first to FIG. 3, there is shown a general construction of a body 11 of a sewing machine in which a sewing operation procedure display apparatus according to the present invention is incorporated.

The sewing machine body 11 generally includes a bed section 12 and an arm section 13 formed integrally on the bed section 12 and extending upwardly and then leftwardly from a right end portion of the bed section 12. A needle bar 15 having a sewing needle 14 thereon is provided at an end portion of the arm section 13. A horizontally rotating shuttle and a feed dog (not shown) are provided in the sewing machine body in an opposing relationship to the needle bar 15.

A motor and power transmitting mechanisms (not shown) for moving the needle bar 15 axially upwardly and downwardly, rocking the needle bar 15 and driving the horizontally rotating shuttle and the feed dog are provided in the sewing machine body 11.

Figure 2:
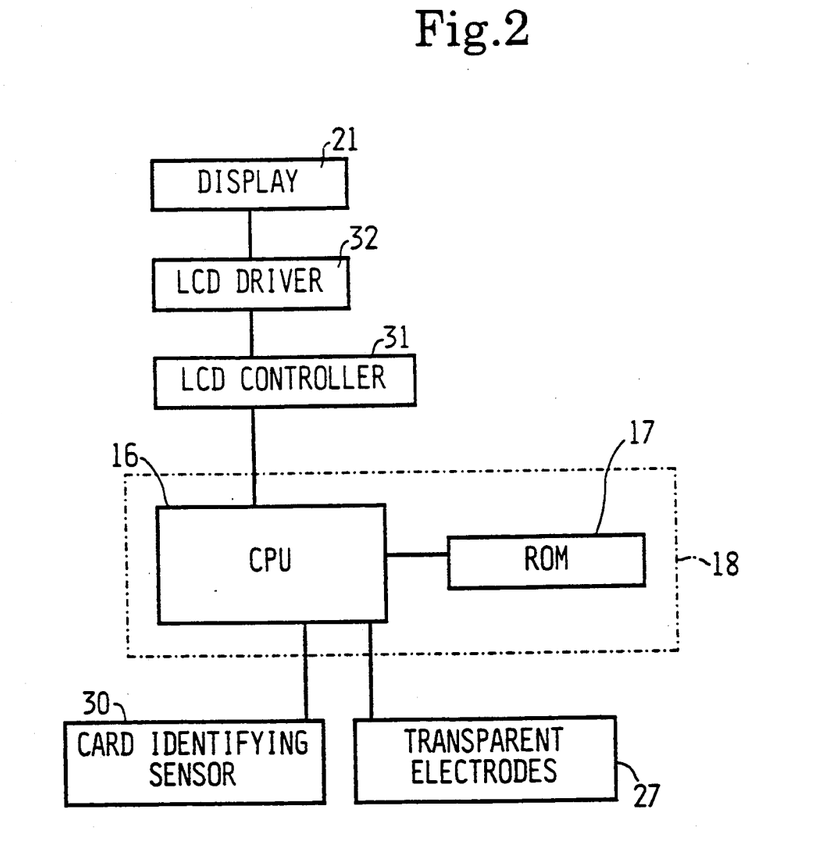
FIG. 2 is a block diagram showing a block diagram of an essential part of the sewing operation procedure display apparatus.

The sewing machine body 11 is controlled by a CPU 16, a ROM 17 in which a control program is stored, etc. as shown in FIG. 2. Further, a presser foot 19 is exchangeably provided in the neighborhood of the sewing needle 14.

As such presser foot 19, several types of presser feet are prepared including an "L presser foot", a "J presser foot", a "P presser foot" and a "button hole sewing presser foot".

Those presser feet 19 are selectively exchanged in 0 accordance with a stitch to be sewn.

A button hole lever 20 which is operated when button hole sewing is to be performed is provided at a lower portion of the end portion of the arm section 13.

Provided on a front face portion of the arm section 13 are a display section 21 formed from an LCD, an operating switch set 24 including a start/stop switch 22 and swing width keys 23, and an operation selection section 25.

Operation selection section 25 is comprised of a transparent base member 26, a plurality of transparent electrodes 27 (refer to FIG. 2) disposed in rows and columns, and a card receiving section 40 formed on the rear face side of the transparent base member 26. The transparent electrodes 27 are formed from two thin transparent resin films adhered to a surface of the transparent base member 26, such as the electrodes disclosed in U.S. Pat. No. 4,943,906 and Japanese Laid-Open Publication No. 2-31789.

A conductive material is applied in a longitudinal direction to one of the thin transparent resin films while the conductive material is applied in a transverse direction to the other thin transparent resin film, thereby forming the transparent electrodes 27.

The CPU 16 detects, by way of the transparent electrodes 27, a location of the operation selection section 25 which an operator touches. Meanwhile, a stitch selecting card, a pattern selecting card or a teaching card is exchangeably set in position in the card receiving section 40. The stitch selecting card has a plurality of stitches indicated thereon. The pattern selecting card has character patterns and picture patterns indicated thereon. The teaching card is such a stitch teaching card 28 as shown in FIG. 4.

Figure 4:
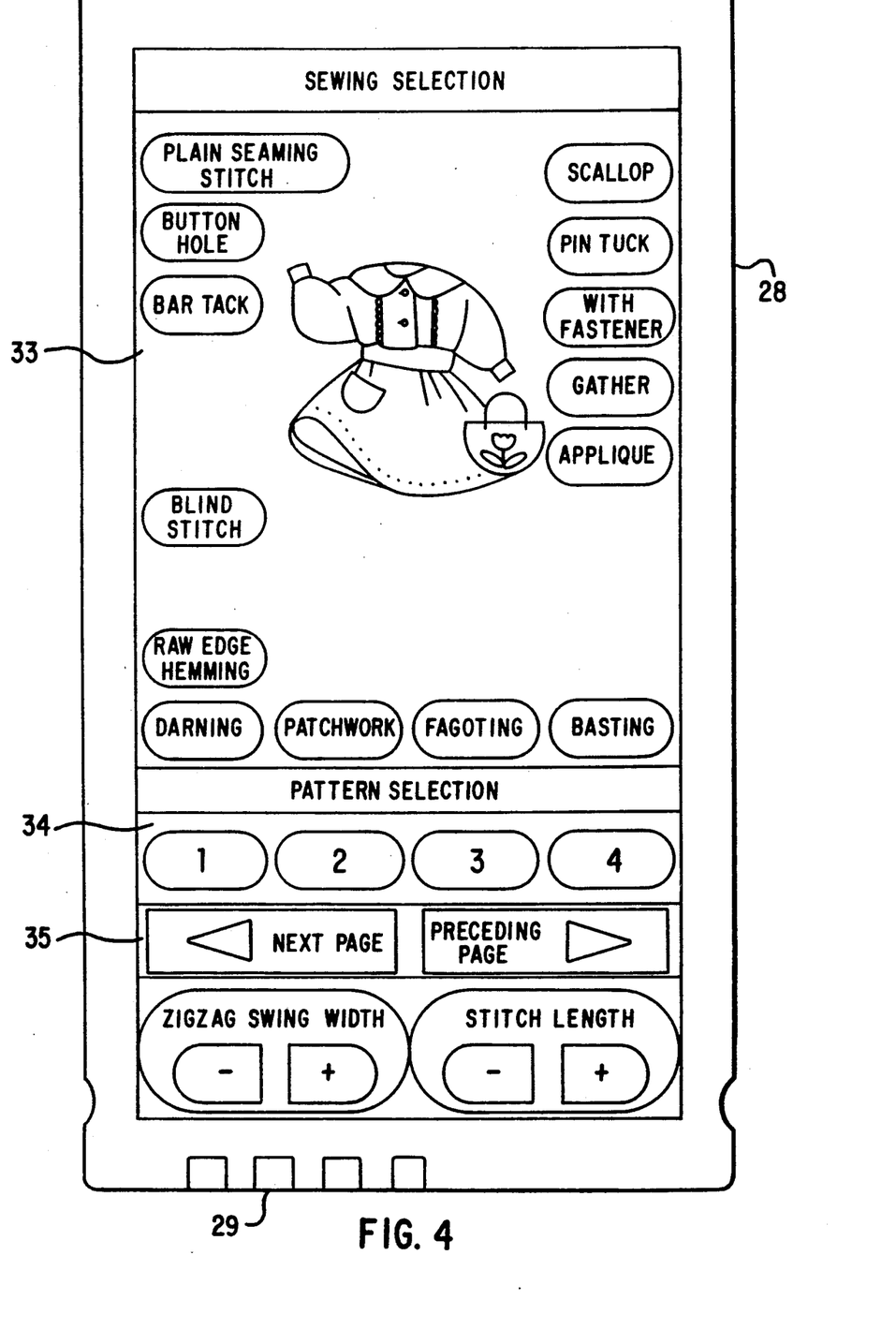
FIG. 4 is a plan view of a stitch teaching card.

Each of the cards has an identifying recessed portion 29 formed along a lower edge thereof as seen in FIG. 4. Meanwhile, the card receiving section has a card identifying sensor 30 provided therein for detecting 0 recesses of the recessed portion 29 of a card as shown in FIG. 2 and outputting detection signal to the CPU 16.

When an operator wants to select a desired stitch and operate the sewing machine to perform sewing of the desired stitch, the stitch selecting card or the pattern selecting card will be inserted into the card receiving section 40 of the operation selection section 25.

Consequently, the sewing machine is placed in a pattern inputting mode.

In this condition, a location of the operation selection section 25 corresponding to the desired stitch indicated on the card will be touched by a finger to select the stitch, and the start/stop switch 22 will be operated.

Consequently, the CPU 16 automatically detects the type of the card and a location of a transparent electrode 27 thus depressed by the finger and reads out sewing operation data corresponding to the desired stitch stored in the ROM 17 in advance.

Thus, the sewing machine body 11 is controlled in accordance with such sewing operation data to perform various sewing operations.

Meanwhile, the display section 21 is controlled by way of an LCD controller 31 and an LCD driver 32 by the CPU 16 as seen in FIG. 2.

The stitch or pattern selected by the operator by way of the operation selection section 25 is displayed on the display section 21 in accordance with display image data stored in the ROM 17 in advance, and an information teaching mode is set.

In such information teaching mode, a teaching picture image for teaching information regarding a sewing operation is displayed to the operator on the display section 21.

The stitch teaching card 28 has an indication 33 of types of stitches such as a "plain seaming stitch", a "button hole", a "blind stitch" and so forth provided at a predetermined upper location thereof as seen in FIG. 4.

Below the indication 33 of types of stitches, an indication 34 of numbers of "1" to "4" for selecting a sewing condition, another indication 35 for the page feeding of "next page" and "preceding page", a further indication for the adjustment of a swing width in a zigzag pattern, and a still further indication for the adjustment of a length of a stitch are provided at respective predetermined locations of the stitch teaching card 28.

If the stitch teaching card 28 is set in position in the operation selection section 25, the CPU 16 executes a program for the sewing operation procedure display.

In this instance, the operator will touch a location of the operation selection section 25 corresponding to the indication 33 of types of stitches by a finger to select a stitch to be taught and will then touch another location of the operation selection section 25 corresponding to the indication 34 for the number selection by a finger to select a sewing condition to be taught.

The ROM 17 stores data of a plurality of teaching picture images for the stitches and sewing conditions. As the sewing operation procedure display program is executed, the CPU 16 reads predetermined teaching picture image data from the ROM 17 in response to a touching operation of any of the transparent electrodes 27 by the operator and controls the display section 21 to display such data thereon.

Subsequently, a procedure in executing the sewing operation procedure display program on the sewing machine of the construction described above will be described in connection with several examples.

Figure 1:
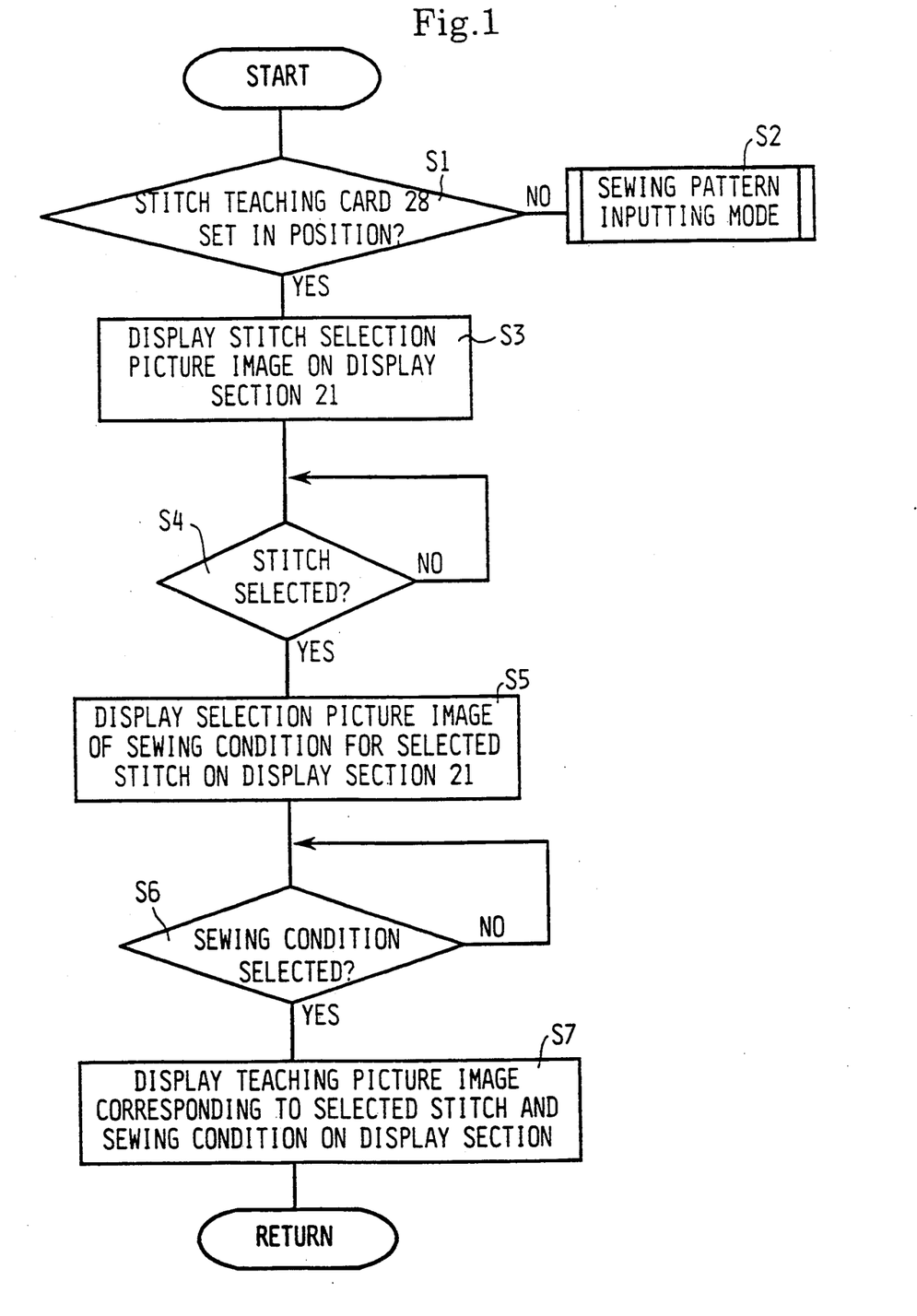
FIG. 1 is a flow chart illustrating a procedure of teaching of information regarding a sewing operation.

Teaching of information regarding a sewing operation is executed in accordance with a flow chart of FIG. 1.

In particular, when an operator wants to know how to use the sewing machine for a certain stitch, the operator will set the stitch teaching card 28 in position into the card receiving section 40 of the operation selection section 25.

Then, the card identifying sensor 30 detects receipt of the card in the card receiving section (Yes at step S1), and the operation selection section 25, the display section 21 and so forth are changed over to an information teaching mode.

It is to be noted that if the stitch teaching card 28 is not set in position (No at step S1), the operation selection section 25, the display section 21 and so forth are placed in a sewing pattern inputting mode as described hereinabove (step S2).

In the information teaching mode, a stitch selection image is first displayed on the display section 21 (step S3).

Figure 5A:
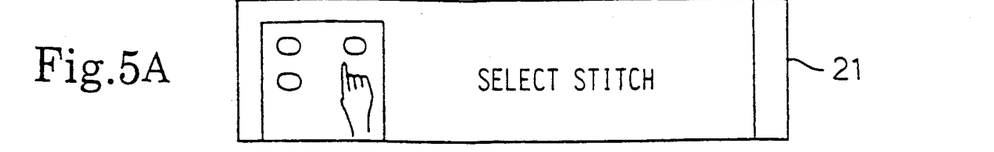
FIGS. 5A–5H are illustrations showing an example of a set of display images for a blind stitch.

According to the stitch selection image, a sentence of "select a stitch" is displayed, for example, as shown in FIG. 5A, together with a picture representing a manner in which a portion of the indication 33 of types of stitches of the stitch teaching card 28, i.e., operation selection section 25, is depressed by a finger.

Here, the operator will touch, by a finger, a location (transparent electrode 27) among the several stitches of the indication 33 of types of stitches, the location corresponding to a particular stitch the operator wants to learn, to select the particular stitch (Yes at step S4).

Then, the thus selected stitch is detected from the location of the transparent electrode 27 thus touched, and the display of the display section 21 is changed over to a selection image of a sewing condition for the selected stitch (step S5).

Figure 5B:
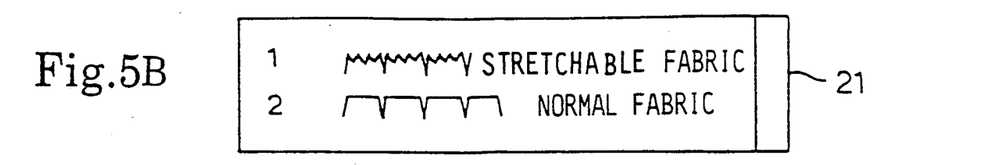

Here, if the operator selects, for example, the "blind stitch" at step S4, the selection image for a sewing condition is a display for the selection of a type of a fabric from between "1. stretchable fabric" or "2. normal fabric" by a number as seen in FIG. 5B.

Subsequently, the operator will observe the selection image for a sewing condition and select a sewing condition (step S6).

Such selection is performed by touching, by a finger, a location of a transparent electrode 27 corresponding to a number to be selected from among the numbers of 1 to 4 of the indication 34 for the selection of the number of the stitch teaching card 28.

Consequently, a teaching picture image corresponding to the selected stitch and sewing condition is displayed on the display section 21 (step S7).

Here, if the operator selects, for example, the "1 stretchable fabric" at step S6, then six pages of teaching picture images are successively displayed on the display section 21 as seen from FIGS. 5C-5H.

Figure 5C:
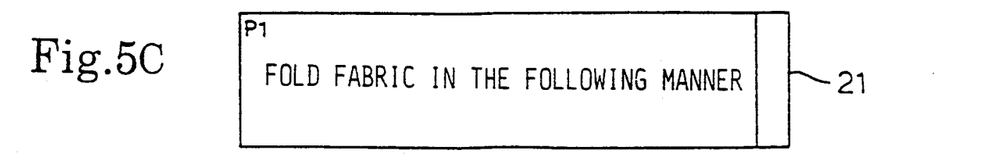
Figure 5D:
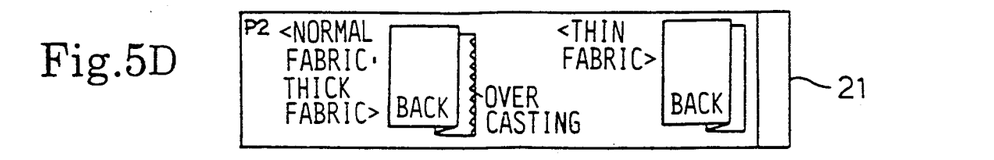
Figure 5E:
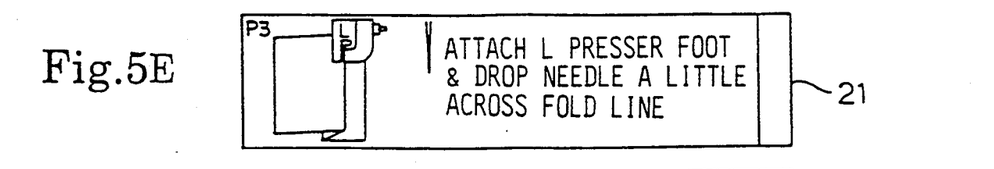
Figure 5F:
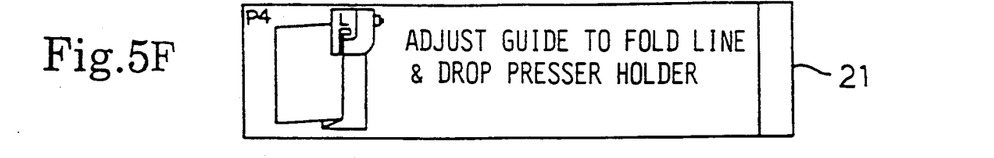
Figure 5G:
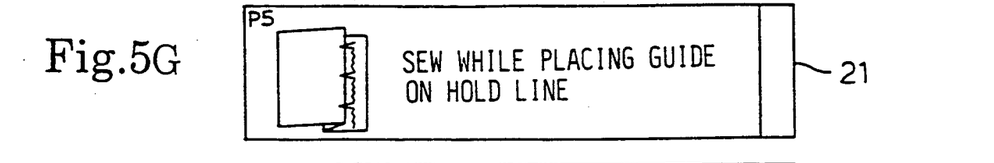
Figure 5H:
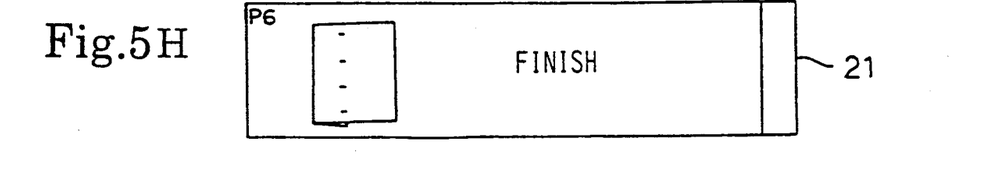

In this instance, the first display page shown in FIG. 5C is initially provided.

Then, when a location of transparent electrode 27 of the "next page" of the page feeding indication 35 is touched by a finger, the display of the display section 21 is changed over in such a manner that a next page appears.

However, the display can be returned to a preceding page by operation of the "preceding page" of the page feeding indication 35.

The operator can learn, by watching contents of such teaching picture images, how to fold a fabric, selective use of the L presser foot among various presser feet or a procedure of a sewing operation.

It is to be noted that the six pages of teaching picture images may be displayed such that they are successively changed over at a suitable interval of time.

Further, in this instance, when the operator wants to rapidly skip a page which has been already understood by the operator to a page the operator wants to see, a location of transparent electrode 27 of the "next page" of the page feeding indication 35 may be touched by a finger so that contents of the page displayed on the display section 21 may be changed over to contents of the next page without the requirement of waiting until the page is automatically changed over.

Figure 6A:
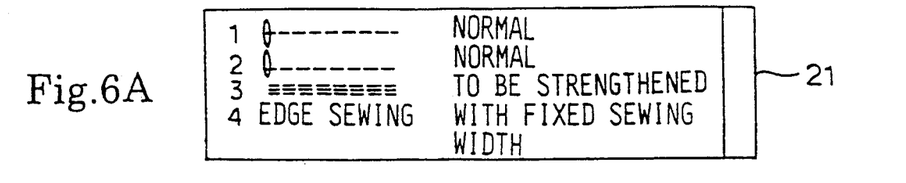
FIGS. 6A–6C are illustrations showing an example of a set of display images for a normal plain seaming stitch.

FIGS. 6A-6C, 7A-7C, 8A-8B and 9A-9D illustrate examples of image displays when an operator selects the "plain seaming stitch" during selection of a stitch at step S4. Here, four such sewing conditions as shown in FIG. 6A are displayed on a selection image of a sewing condition at step S5.

Figure 6B:
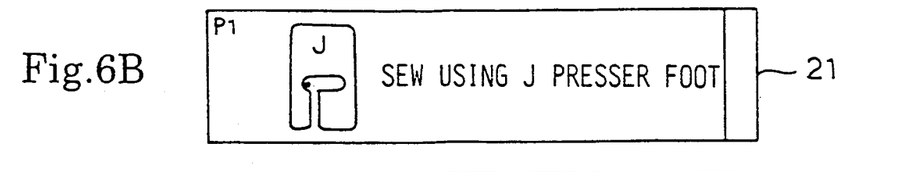
Figure 6C:
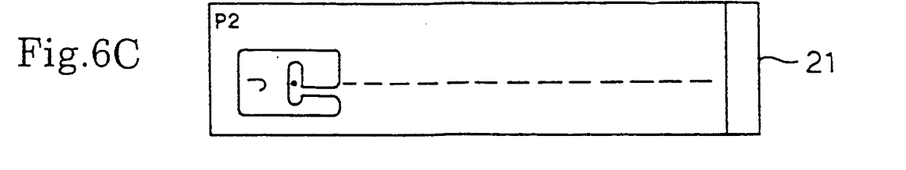
Figure 7A:
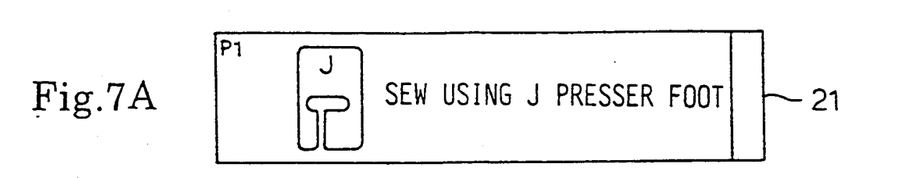
FIGS. 7A–7C are illustrations showing an example of a set of display images for a normal plain seaming stitch in which changing of a needle position is involved.
Figure 7B:
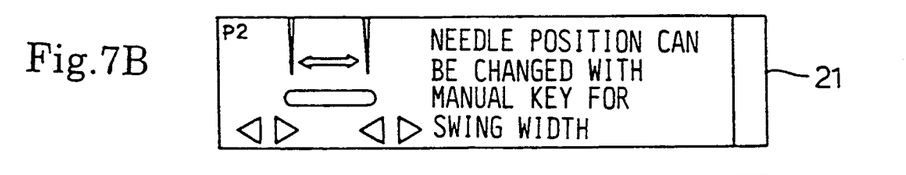
Figure 7C:
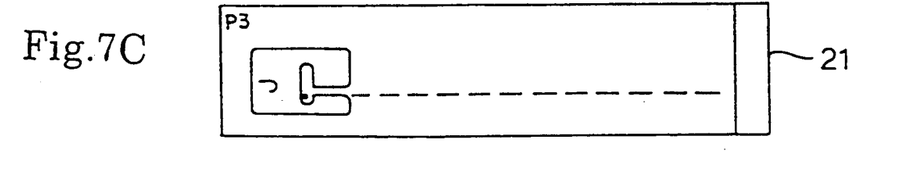
Figure 8A:
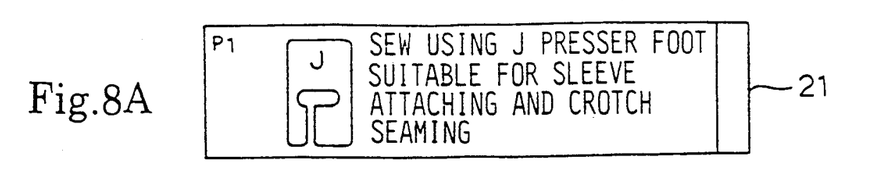
FIGS. 8A–8B are illustrations showing an example of a set of display images for a strengthened plain seaming stitch.
Figure 8B:
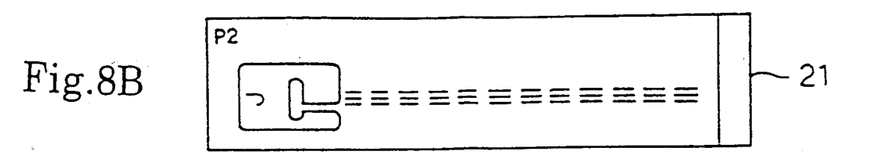
Figure 9A:
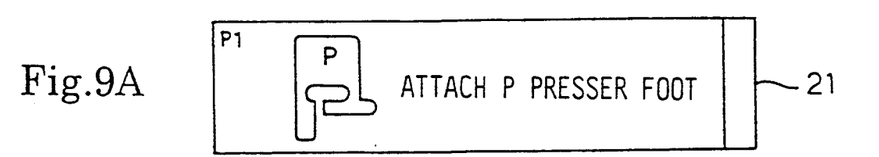
FIGS. 9A–9D are illustrations showing an example of a series of display images for edge sewing of a plain seaming stitch.
Figure 9B:
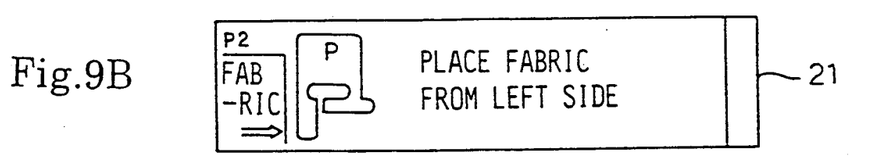
Figure 9C:
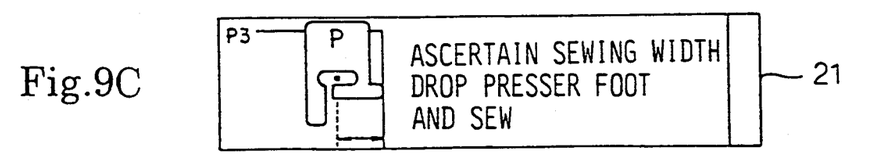
Figure 9D:
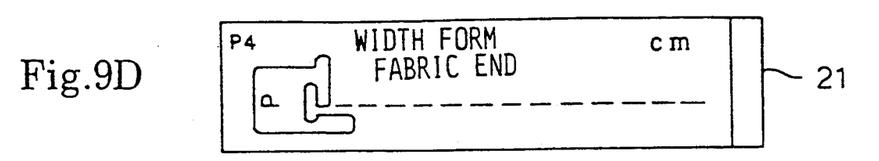

Then, if the "1. normal case" is selected, teaching picture images shown in FIGS. 6B and 6C are displayed on the display section 21; if the "2. normal case" is selected, teaching picture images shown in FIGS. 7A to 7C are displayed on the display section 21; if the "3. to be strengthened" is selected, teaching picture images shown in FIGS. 8A and 8B are displayed on the display section 21; and if the "4. edge sewing" is selected, teaching picture images shown in FIGS. 9A to 9D are displayed on the display section 21.

On the other hand, FIGS. 10A-10H illustrate examples of display images when an operator selects a stitch of "button hole".

Figures 10A, 10B:
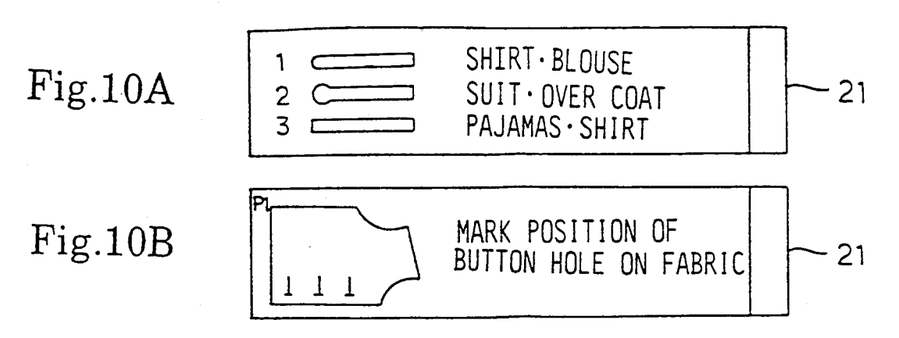
FIGS. 10A–10H are illustrations showing an example of a set of display images for button hole sewing.
Figure 10C:
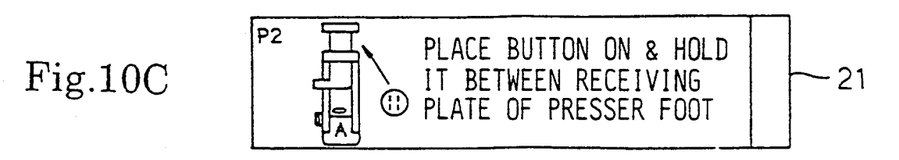
Figure 10D:
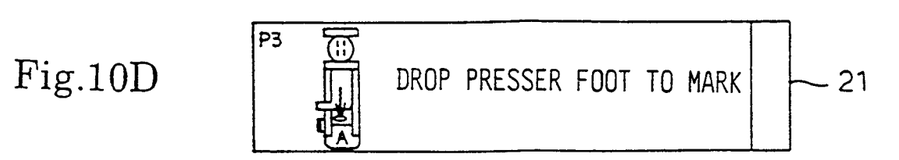
Figure 10E:
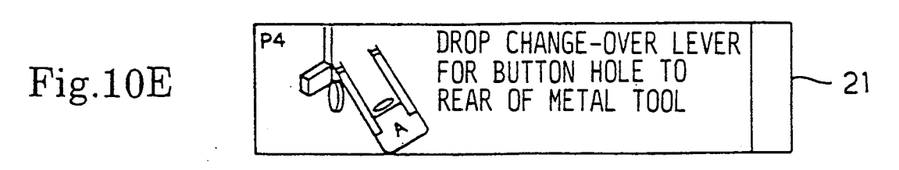
Figure 10F:
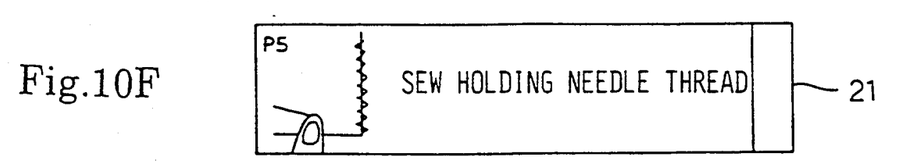
Figure 10G:
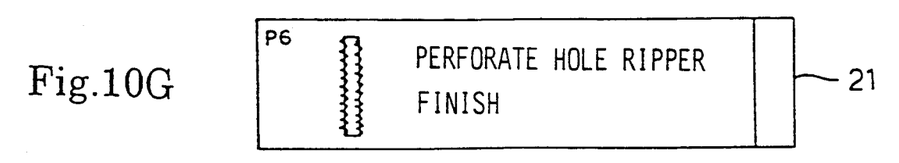
Figure 10H:
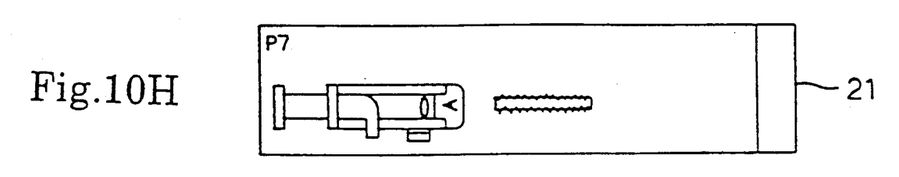

Here, three sewing conditions as seen in FIG. 10A are displayed, and if an operator selects the "3. pajamas, shirt" as a type of clothes, teaching picture images shown in FIGS. 10B to 10H are displayed on the display section 21.

In this manner, according to the present embodiment, based on data of a plurality of teaching picture images for stitches and sewing conditions stored in the ROM 17, a teaching picture image is displayed on the display section 21 in accordance with a stitch and a sewing condition selected by an operator.

Accordingly, as distinct from a conventional sewing machine in which a single teaching picture image is prepared for each stitch, information regarding a sewing operation in which not only a stitch but also a sewing condition are taken into consideration can be taught to an 10 operator. Accordingly, information regarding a sewing operation can be taught to an operator in detail and in a manner in which the operator can readily understand.

Further, since information regarding a sewing operation is displayed over a plurality of pages of teaching picture images, further detailed teaching which is easy to understand can be performed.

It is to be noted that the present invention is not restricted to the specific embodiment described above, and for example, an information teaching mode may otherwise be changed over by operation of a switch without using a card.

While this invention has been described in conjunction with a specific embodiment thereof, it is evident that many alternatives, modifications and variations will be apparent to those skilled in the art. Accordingly, the preferred embodiment of the invention as set forth herein is made without departing from the spirit and scope of the invention as defined in the following claims.

What is claimed is:

1. A sewing operation procedure display apparatus in a sewing machine for teaching information regarding a sewing operation, comprising:
   a display section provided on a body of said sewing machine;
   storage means for storing picture image data related to a plurality of teaching picture images, said picture image data corresponding to stitches and sewing conditions;
   stitch selecting means on the body of the sewing machine for selecting a desired stitch from a plurality of stitches;
   sewing condition selecting means on the body of the sewing machine for selecting a desired sewing condition from a plurality of sewing conditions, said stitch selecting means and said sewing condition selecting means including an operation selection section comprised of a large number of transparent electrodes disposed in rows and columns on a surface of a transparent base member and a card receiving section formed on a face side of said transparent base member for receiving a stitch teaching card; and
   display controlling means responsive to operation of said stitch selecting means and said sewing condition selecting means for reading out the picture image data related to at least one teaching picture image corresponding to a selected stitch and a selected sewing condition from said storage means, said display controlling means causing said display section to display the at least one teaching picture image based on the read picture image data.

2. The sewing operation procedure display apparatus in a sewing machine according to claim 1, wherein said display controlling means causes said display section to display thereon a teaching picture image in accordance with the stitch and the sewing condition in response to positioning of the stitch teaching card in said card receiving section of said operation selection section.

3. The sewing operation procedure display apparatus in a sewing machine according to claim 3, further comprising detecting means for detecting that the stitch teaching card has been positioned into said card receiving section of said operation selection section.

4. The sewing operation procedure display apparatus in a sewing machine according to claim 1, wherein said display controlling means successively reads out plural picture image data related to a plurality of teaching picture images corresponding to the stitch and the sewing condition over a suitable interval of time from said storage means.

5. The sewing operation procedure display apparatus in a sewing machine according to claim 5, wherein said display controlling means causes said display section to successively display thereon the plurality of teaching picture images corresponding to the stitch and the sewing condition over the suitable interval of time based on the plural picture image data read out successively from said storage means.

6. The sewing operation procedure display apparatus in a sewing machine according to claim 5, wherein said display controlling means includes change-over means for changing over the plurality of teaching picture images corresponding to the stitch and the sewing condition.

7. The sewing operation procedure display apparatus in a sewing machine according to claim wherein said display controlling means includes a manual switch and causes said display section to display thereon a teaching picture image corresponding to the stitch and the sewing condition in response to manual operation of the manual switch.

8. The sewing operation procedure display apparatus in a sewing machine according to claim 4, wherein said display controlling means places said operation selection section and said display section into a sewing pattern inputting mode when said detecting means detects that the stitch teaching card is not positioned in said card receiving section of said operation selection section.

9. A sewing operation procedure display apparatus in a sewing machine for teaching information regarding a sewing operation, comprising:
   a display section provided on a body of said sewing machine;
   stitch selecting means on the body of said sewing machine for selecting a desired stitch from plural different stitches;
   sewing condition selecting means on the body of said sewing machine for selecting a desired sewing condition from plural different sewing conditions related to each of the plural different stitches;
   storage means for storing picture image data indicative of a series of teaching picture images corresponding to each of the plural different stitches, the series of teaching picture images including a first teaching picture image representing plural different sewing conditions possible to form each of the plural different stitches and a second teaching picture image representing a sewing operation procedure related to each of the plural different possible sewing conditions; and
   display controlling means for reading out the picture image data indicative of the first teaching picture image from said storage means and causing the display section to display the first teaching picture image in accordance with the desired stitch selected by the stitch selecting means, and for reading out the picture image data indicative of the second teaching picture image from said storage means and causing the display section to display the second teaching picture image in accordance with the desired sewing condition selected by the sewing condition selecting means.

10. The sewing operation procedure display apparatus in a sewing machine according to claim 9, wherein the first teaching picture image represents plural different sewing conditions prearranged based on plural types of a fabric to be sewn.

11. The sewing operation procedure display apparatus in a sewing machine according to claim 9, wherein the first teaching picture image represents plural different sewing conditions prearranged based on plural types of clothes to be sewn.

12. The sewing operation procedure display apparatus in a sewing machine according to claim 9, wherein the second teaching picture image comprises a series of display images representing a series of operations by an operator to form the desired stitch under the desired sewing condition.

13. The sewing operation procedure display apparatus in a sewing machine according to claim 12, wherein the display controlling means controls the display section to sequentially display the series of display images over a suitable interval of time.

14. The sewing operation procedure display apparatus in a sewing machine according to claim 12, wherein the display controlling means includes a manual switch operable to change over the series of display images displayed by the display section.

15. The sewing operation procedure display apparatus in a sewing machine according to claim 9, wherein the stitch selecting means and the sewing condition selecting means are allotted in an operation selection section provided on the body of the sewing machine, and the operation selection section has a card receiving section for receiving a stitch teaching card which includes a first indication representing the plural different stitches and a second indication related to the plural different sewing conditions.

* * * * *